United States Patent [19]

Petersson

[11] 4,320,868

[45] Mar. 23, 1982

[54] ENVELOPE MATERIAL FOR USE IN ENVELOPE PRODUCING MACHINE

[75] Inventor: Nils E. Petersson, Nybro, Sweden

[73] Assignee: AB Sture Ljungdahl, Nybro, Sweden

[21] Appl. No.: 98,400

[22] Filed: Nov. 29, 1979

Related U.S. Application Data

[63] Continuation of Ser. No. 835,144, Sep. 21, 1977, abandoned.

[51] Int. Cl.[3] .......................... B32B 3/10; B65D 27/10

[52] U.S. Cl. ...................................... 229/75; 156/184; 229/69; 242/55; 282/11.5 R; 282/25; 428/43; 428/134; 428/194; 428/200; 428/211; 428/906; 428/131

[58] Field of Search ........................ 206/389, 395, 824; 229/69; 282/11.5 R, 11.5 A, 25; 428/195, 211, 343, 537, 906, 47, 78, 131, 134, 194, 200, 913; 156/108, 184, 193, 195; 242/1, 54 R, 55

[56] References Cited

U.S. PATENT DOCUMENTS

| | | | |
|---|---|---|---|
| 2,299,751 | 10/1942 | Huffman | 282/11.5 R |
| 2,464,490 | 3/1949 | Davies | 229/69 |
| 3,140,816 | 7/1964 | Schultz | 229/69 |
| 3,476,307 | 11/1969 | Faltin et al. | 229/69 |
| 3,482,780 | 12/1969 | Johnsen | 229/69 |
| 3,507,519 | 4/1970 | McNabb | 282/11.5 R |
| 3,547,343 | 12/1970 | Alton | 229/69 |
| 3,559,875 | 2/1971 | Wilson | 229/69 |
| 3,652,007 | 3/1972 | MacDougall | 229/69 X |
| 3,837,565 | 9/1974 | Johnsen | 229/69 |
| 4,012,268 | 3/1977 | Johnsen | 229/69 X |
| 4,066,206 | 1/1978 | Peterson | 282/11.5 A X |

FOREIGN PATENT DOCUMENTS

| | | | |
|---|---|---|---|
| 487035 | 4/1970 | Switzerland | 229/69 |

OTHER PUBLICATIONS

*Webster's New World Dictionary,* 1972, p. 352.

*Primary Examiner*—Bruce H. Hess
*Attorney, Agent, or Firm*—Hane, Roberts, Spiecens & Cohen

[57] ABSTRACT

A length of envelope material adapted for being fed to an envelope-forming machine in which the material comprises a succession of envelope units in an unbroken row wound in the form of a roll with a succession of windings. Each envelope unit has a transverse fold line dividing the unit into two halves along which separated units can be respectively folded to form respective envelopes. Each envelope unit has a window opening and a transparent cover on the opening. First strings of glue are provided on each unit for joining the halves thereof together after folding along the fold line. Further strings of glue join the transparent cover to the unit. The strings of glue and the transparent cover are of respective thicknesses to form a uniform elevation at one side of the material of each unit. The diameter of the roll in which the length of material is wound corresponds to the dimensional length of each unit and the thickness of the glue strings and covers so that the roll is substantially cylindrical.

5 Claims, 3 Drawing Figures

ENVELOPE MATERIAL FOR USE IN ENVELOPE PRODUCING MACHINE

This is a continuation application of application Ser. No. 835,144 filed Sept. 21, 1977, now abandoned.

FIELD OF THE INVENTION

The present invention relates to a length of envelope material mainly for an enveloping machine.

BACKGROUND

Each piece of envelope material consists of a plane sheet, which is folded along a line, mainly a bending line, so that two envelope halves are created, which are folded against each other thus forming an envelope. The envelope material is provided with strings of glue so that the envelope halves, when they are folded against each other, will adhere to each other so that an enclosed envelope is obtained. It is usually sufficient to use three strings of glue as the fourth edge of the envelope formed makes up the mentioned bending line. Furthermore, the envelope material is provided with a see-through window. In this respect, a window opening is cut and covered by transparent foil, which is glued along the edges of the window opening. The strings of glue and the layer forming the window are arranged on the same side of the envelope material. The envelope materials are usually fed to an enveloping machine. The formed envelope, i.e. when the two halves of the envelope material lie against each other, is supplied with the contents with which the envelope is to be filled before the sealing of the envelope takes place. As enveloping machines operate at a very high speed, the individual envelope materials must be connected one after the other so that a long row of envelope materials is obtained. The envelope materials which are arranged one after the other form a band. In the enveloping machine, the individual envelope materials are separated from the band and folded so that two opposite halves are obtained.

The band with the envelope material must be supplied to the enveloping machine in the form of a unit, and it has been determined that it is easiest to shape the band so that a pile is obtained, i.e. the band is shaped zigzag and each zigzag unit consists of an envelope material.

By supplying a pile of envelope materials to the enveloping machine, the handling of the envelope materials becomes a little jerky. A better way of supplying envelope materials to an enveloping machine would be to have the envelope materials stored in the form of a roll. If a roll is to be used for storage, very large requirements will be made for the cylindrical shape of the roll, both as regards the speed of rotation of the roll and as regards the storage of the roll.

SUMMARY OF THE INVENTION

An object of the present invention is to make a length of paper consisting of envelope materials, which is rolled up in the form of a roll on a creel, where the wound roll mainly has a cylindrical outer surface.

According to the invention, this object is achieved by using a creel the diameter of which is selected in proportion to the length of the individual envelope material and taking into account the thickness of the envelope material, so that in one revolution of winding, the envelope material is displaced in proportion to the envelope material in the previous revolution of winding.

After a certain number of revolutions of winding, an envelope material is going to be situated exactly over the envelope material in the revolution of winding from which the the number of revolutions of winding is counted.

According to the invention all of the strings of glue as well as the foil covering the window opening together with the glue therefor should be of the same thickness.

As the glue, it is preferable to use a type which will not become adhesive until it is heated.

The length of envelope material can consist of several rows of envelope material placed next to each other. A roll with such a length of envelope material is cut prior to use into a number of rolls corresponding to the number of envelope materials arranged in succession.

Further features of the present invention appear from the detailed description given hereafter with reference to the attached drawings.

DETAILED DESCRIPTION

Figure 1:
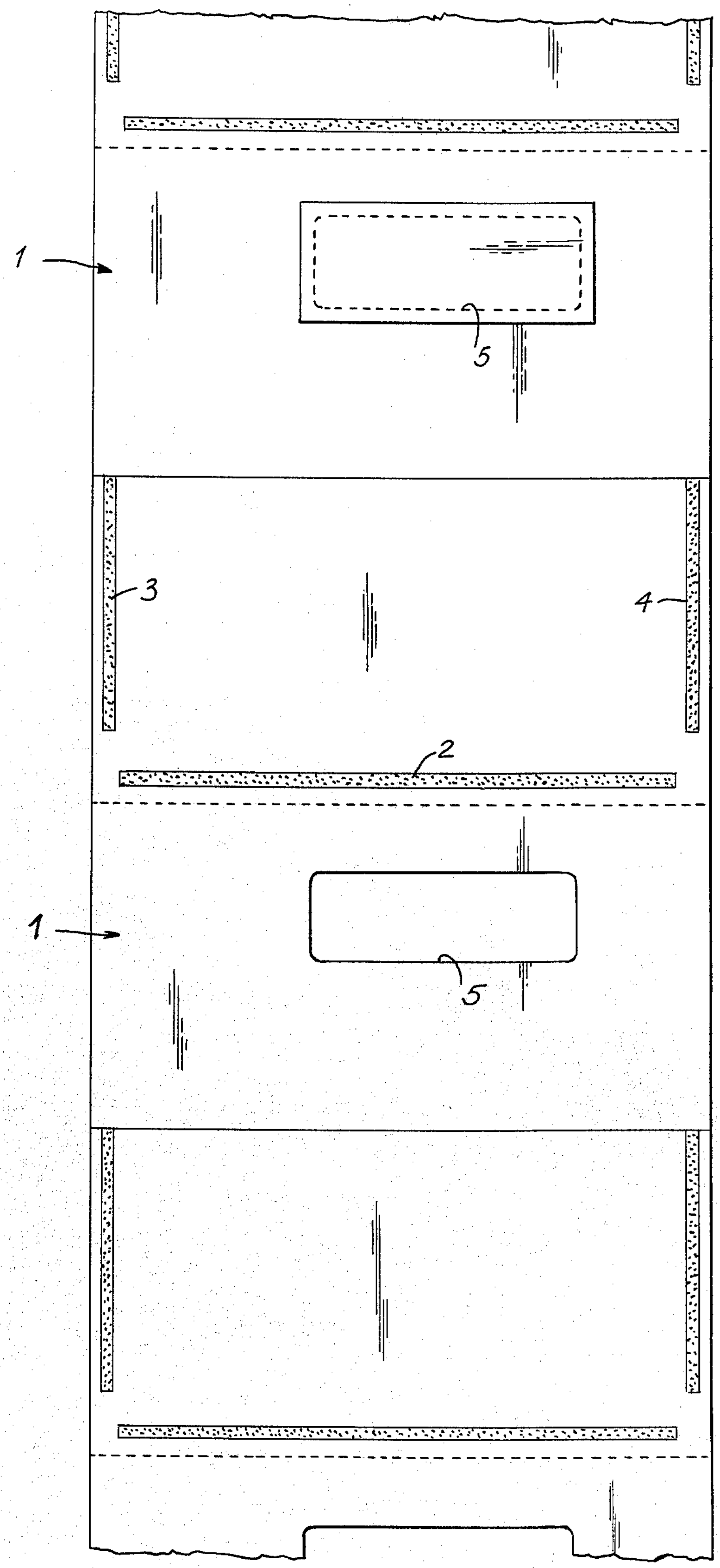
FIG. 1 shows a length of envelope material consisting of a row of envelope materials arranged in succession.

In FIG. 1 is shown an envelope material 1 which is suitably of a thickness of 0.11 mm. At the bottom, the envelope material is provided with a string of glue 2. It will be suitable for the string of glue to consist of a glue which becomes adhesive when it is heated. Immediately below the string of glue 2, the envelope material 1 is intended to be separated from the envelope material below, for instance, by means of a cutter or knife. Alternatively, the envelope material below the string of glue can be provided with a perforation. Furthermore, the envelope material is provided close to its vertical edges, with two vertical strings of glue 3 and 4 of the same kind as the string of glue 2. Above the vertical strings of glue 3 and 4 is shown the horizontal string of glue on the envelope material situated above. A separation between the latter envelope material and envelope material 1 will take place below the last-mentioned horizontal string of glue. The envelope material is also provided with a window opening 5, which is covered by a foil made, for instance, of grease-proof paper. The foil is glued at the edges of the window on the surface of the envelope material. The strings of glue 2, 3, and 4, and on the window 5 extend to the same height on the same side of the envelope material 1, i.e. 0.05 mm. This entails that the envelope material is of a thickness of 0.11 mm where there is no glue, and where there is glue the thickness is 0.16 mm. Thus, the window with glue is of a thickness of 0.05 mm. The width of the envelope material is 234 mm and the length is 234 mm. The length is determined by the upper separating cut and the bottom separating cut. In the middle between these cuts the envelope material is intended to be folded along a transverse line, so that two equal envelope halves are obtained which can be folded against each other.

The length of envelope materials shown consists of a single row, but it should be obvious that more rows placed next to each other could be arranged. In such arrangement, the envelope materials in each row will be situated at the same level.

Figure 3:
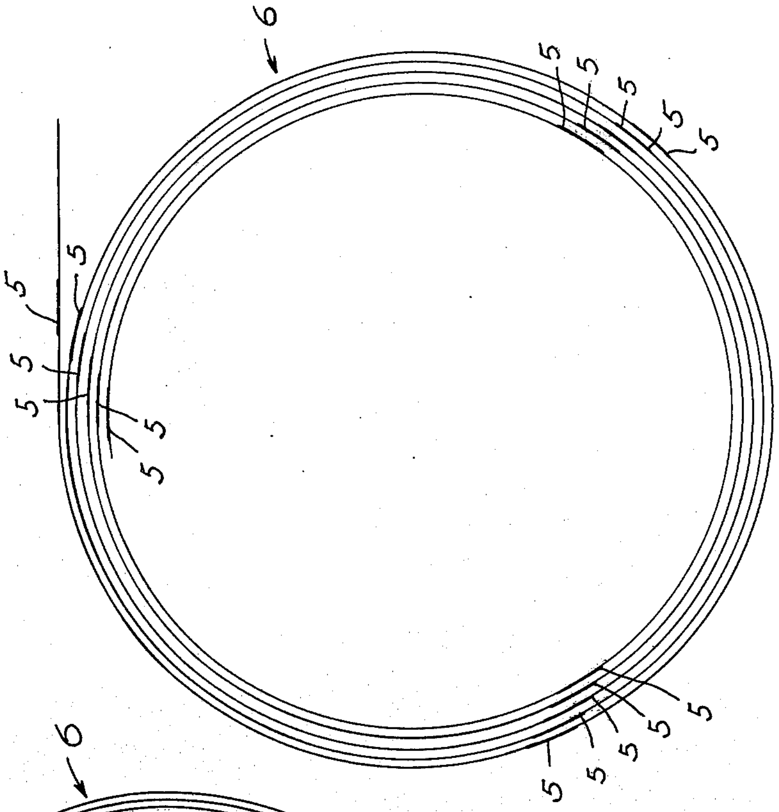
FIG. 3 shows a cross section of the same roll, which clearly illustrates the displacement of the envelope materials in the course of winding in proportion to each other.
Figure 2:
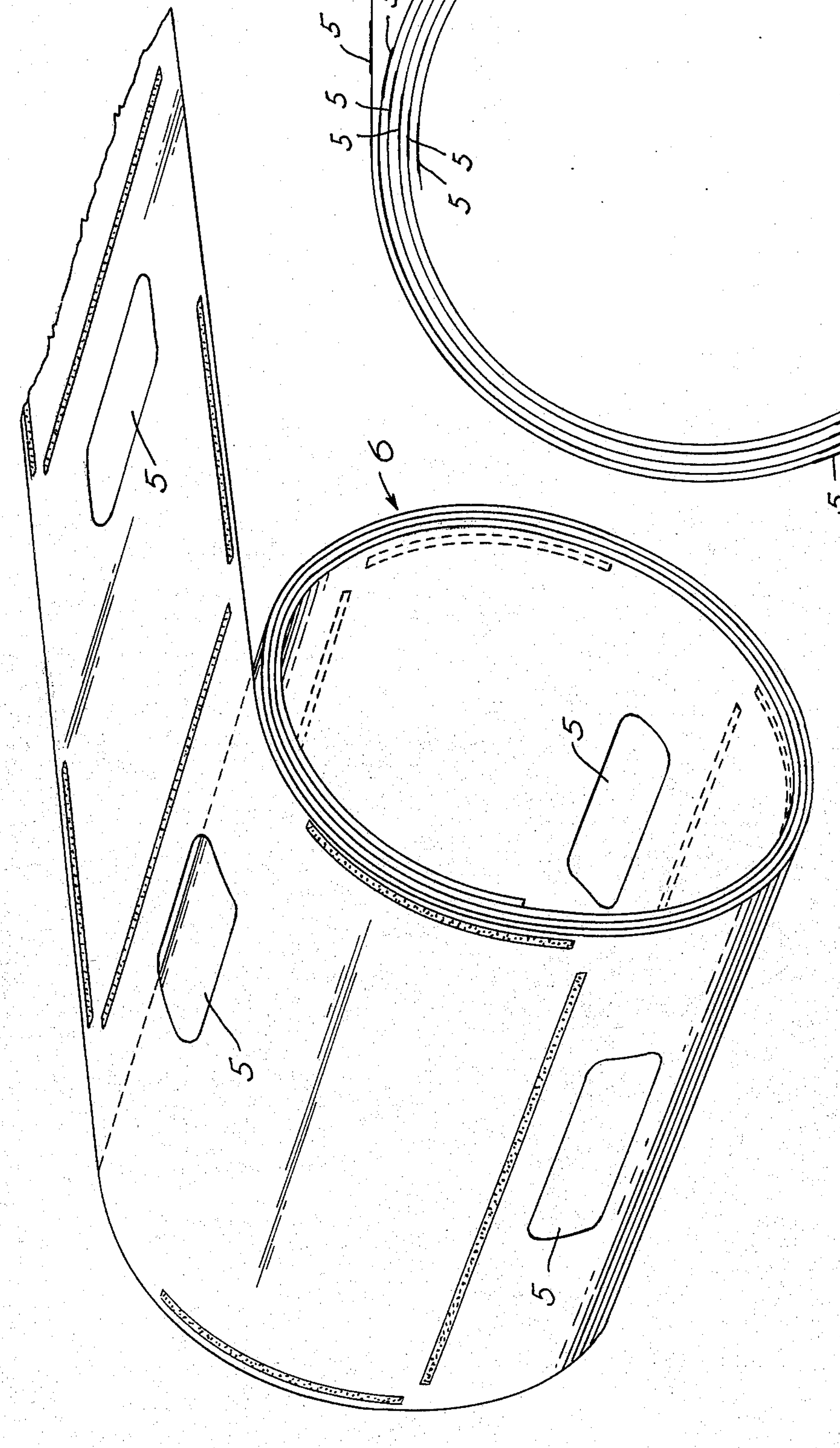
FIG. 2 shows the length of envelope material rolled into a cylindrical roll seen in perspective.

A length of envelope material according to FIG. 1 can suitably be rolled on a creel, which is not shown, in such a way that a ring-shaped magazine 6 is obtained, in which the envelope material in one layer is displaced in proportion to the envelope material in the layer below. The displacement can most easily be seen by looking at the window 5 in the envelope mterial. Thus, it is seen in FIG. 3 how the windows 5 of the various windings are displaced successively. After a certain number of windings the window 5 will be situated exactly over the window 5 of an envelope material in the inmost round. It has turned out that if a creel of 150 mm is chosen, and if the length for the envelope material is 23.4 mm then the window 5 is going to move in each winding as shown in FIGS. 2 and 3. The final result will be that when the winding of a roll has been finished, it has, by and large a cylindrical outer surface. When the creel has a diameter of 220 mm the outermost winding will hold 3 envelope materials, at a diameter of 295 mm 4 materials, at a diameter of 370 mm 5 materials, at a diameter of 450 mm 6 materials, at a diameter of 520 mm 7 materials, and at a diameter of 600 mm 8 materials. At these values the envelope materials have a thickness of 0.11 mm and the strings of glue a thickness of 0.05 mm. The latter thickness even applies to window and means of glue. A formula can generally be made on the basis of the above values, which exactly tells us which diameter the creel must have in order that the used length of material can have a cylindrical outer surface in connection with variations of the thickness of the envelope material and the thickness of the string of glue and the length of the envelope material.

I claim:

1. A length of envelope material adapted for being fed to an envelope-forming machine, said material comprising a succession of envelope units in an unbroken row, each envelope unit having a transverse fold line dividing the unit into two halves along which fold lines separated units can be respectively folded to form respective envelopes, each envelope unit having a window opening and a transparent cover on said opening, first strings of glue on each said unit for joining the halves thereof together after folding along the fold line, further strings of glue joining the transparent cover to said unit, said first strings of glue having a determinable thickness and said further strings of glue together with the transparent cover also having a determinable thickness, said first strings and further strings being on the same side of the material of each unit, the thickness of the glue strings and transparent covers being such as to form equal elevations on the same side of the material, said length of envelope material being wound in a roll having a relatively large inner diameter related to (1) the dimensional length of each envelope unit and (2) the thickness of the envelope material, glue strings and covers, said inner diameter being selected to provide at least three units of envelope material in the innermost winding of the roll, said envelope units being successively juxtaposed in successive windings and offset by equal amounts in the successive windings, said window openings of the successively juxtaposed envelope units in successive windings being partially overlapped in equally spaced relation on said roll whereby said roll is substantially cylindrical.

2. A length of envelope material as claimed in claim 1 wherein an envelope unit in one winding will become aligned with an envelope unit in a previous winding after a number of intermediate windings therebetween.

3. A length of envelope material as claimed in claim 1, wherein said halves of each unit are folded into confronting relation to form the envelope unit, each glue string in one half coming into contact with a bare surface of the other half to adhesively secure said halves and form the envelope unit.

4. A length of envelope material as claimed in claim 3 wherein the glue strings are heat sensitive.

5. A method of storing a length of envelope material adapted for being fed to an envelope-foming machine, said method comprising forming a succession of envelope units in an unbroken row, each envelope unit having a transverse fold line dividing the unit into two halves along which fold lines separated units can be respectively folded to form respective envelopes, forming each envelope unit with a window opening and a transparent cover on said opening, providing first strings of glue on each said unit for joining the halves thereof together after folding along the fold line, providing further strings of glue joining the transparent cover to said unit, said first strings of glue having a determinable thickness and said further strings of glue together with the transparent cover also having a determinable thickness, said first strings and further strings being provided on the same side of the material of each unit, the thickness of the glue strings and transparent covers being such as to form equal elevations on the same side of the material, and winding said length of envelope material into a roll having a relatively large inner diameter related to (1) the dimensional length of each envelope unit and (2) the thickness of the envelope material, glue strings and covers, said inner diameter being selected to provide at least three units of envelope material in the innermost winding of the roll, said envelope units being successively juxtaposed in successive windings and offset by equal amounts in the successive windings, said window openings of the successively juxtaposed envelope units in successive windings being partially overlapped in equally spaced relation on said roll whereby said roll is substantially cylindrical.

* * * * *